July 3, 1956
A. PONSELL
2,752,625
HANDLE GRIP FOR CLEANING DEVICES
Filed July 20, 1951
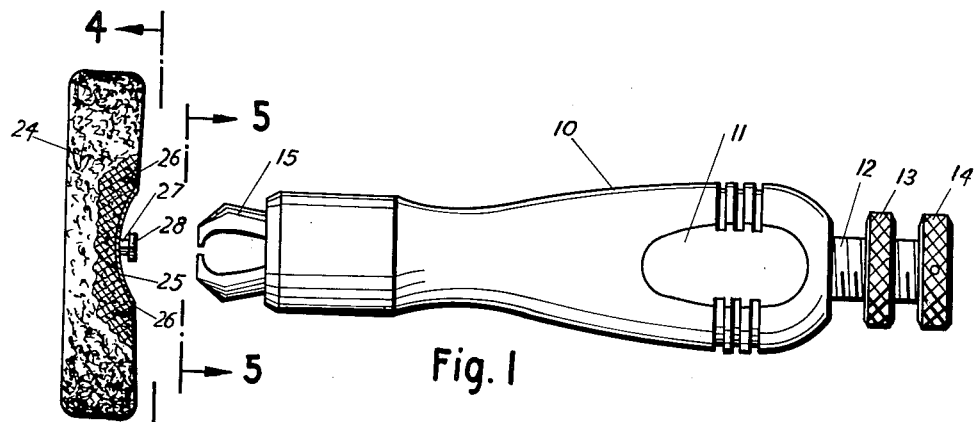
Fig. 1
Fig. 2
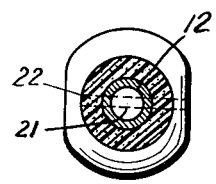
Fig. 6
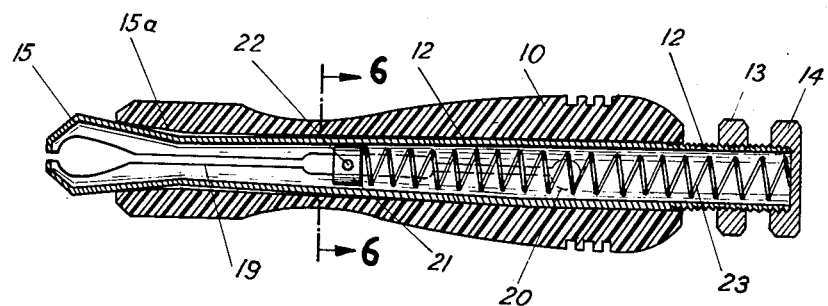
Fig. 3
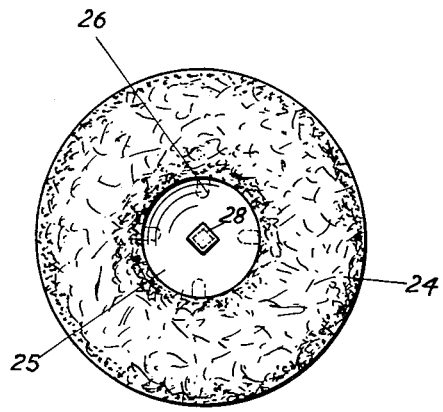
Fig. 4
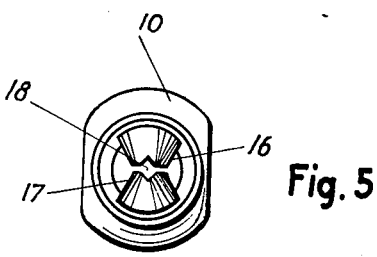
Fig. 5
*Athalia Ponsell*
INVENTOR.
BY *Peter W. Boesen*

United States Patent Office 2,752,625
Patented July 3, 1956

2,752,625

HANDLE GRIP FOR CLEANING DEVICES

Athalia Ponsell, New York, N. Y.

Application July 20, 1951, Serial No. 237,768

1 Claim. (Cl. 15—209)

This invention relates to improvements in handle grips for cleaning devices for scrubbing pots and pans and specifically it refers to an improved method of a handle with an automatic grip for holding specially prepared pads of steel wool.

Steel wool cleaning pads for cleaning pots and pans have been used for many years, but have always been objectionable due to the damage it would do to the skin and nails of the fingers of the user. In cases where strong soaps or other polishes are used, this is furthermore made worse by the chemical action of same. In the present cleaning device, these difficulties have been completely eliminated and by means of the thick grip handle, it is possible to remove the steel wool pad from a packing and use same for efficiently cleaning and scrubbing pots and pans, and finally dropping the used pad in a waste receptacle all without touching the human hands.

The main object of my invention, is to provide an efficient manually operated handle grip for a cleaning device for using steel wool pads and similar leading mediums, without necessitating touching of same with the hands.

Another object of my invention is to provide a cleaning device with a gripping handle which may be used to pick up the cleaning pad from a packing and holding same securely while in use and to drop the pad after used by pressing a button.

Another object of my invention is to provide an efficient handle grip for a cleaning device for using steel wool pads and the like and which is of low cost and easy and practical to use.

Other objects and advantages of the invention will be apparent during the course of the following description.

In the accompanying drawings, forming a part of this specification, and in which like numerals are employed to designate like parts throughout the same.

Figure 1 is a side elevation of a handle grip embodying my invention,

Figure 2 is a section of elevation of a steel wool pad suitable for attaching to the handle grip shown in Figure 1, Figure 3 represents a longitudinal section of the handle grip shown in Figure 1, Figure 4 is a plan view of a pad taken along the line 4—4 in Figure 2, Figure 5 represents an elevation of the end of the handle grip taken along line 5—5 in Figure 1, and Figure 6 is a section taken along line 6—6 in Figure 3.

In the drawings, wherein for the purpose of illustration, is shown a preferred embodiment of my invention, the numeral 10, designates a handle grip, which is preferably made from plastic or other suitable material. The handle grip is of circular cross section, but has several flats 11, on its side to prevent rolling. The handle grip 10, has an axial bore through which is placed a tubular member 12, which is threaded at one end and has a lock nut 13 and a cap nut 14. The other end of the tubular member 12, is split and is formed into the shape of a chuck 15.

The chuck 15, has two dents in jaws 16 and 17, which when they come together form a square hole 18, see Figure 5. The tubular member 12, has a split 19 on both sides, which extends back to a transverse hole 20, thereby permitting a certain spring action between the two jaws 16 and 17. A cylindrical block 21, is fastened to the handle grip 10, by means of a throughgoing pin 22, see Figures 3 and 6. On both sides of the block 21, the pin 22 extends through an enlarged portion of the slot 19, and into the handle 10. A spring wire coil spring 23, is placed under compression between the block 21, and the cap nut 14. At the end of the handle grip 10 nearest the chuck 15, the handle grip 10 has a conical bore 15a into which the conical portion of chuck 15 is drawn by spring 23, and secured tightly when so desired by lock nut 13.

The steel wool pads 24, are standard pads such as commonly used except that they are fitted with a cupped washer 25, which is fastened to the pad 24, by means of fingers or prongs 26, which are clinched over inside the steel wool pad as shown in Figure 2. In the center of the capped washer 25, there is a square stud 27, with head 28. This stud is securely fastened to the washer 25 and fits the opening 18, in the jaws of chuck 15.

The operation of my device is as follows: the operator holds the handle grip 10, and presses down on the cap nut 14 with the thumb. This compresses the spring 23 and the entire tubular member 12, moves through the handle grip 10, until the lock nut 13 strikes against the end of the handle 10. As the chuck 15, emerges from the conical bore 15a, the two jaws 16 and 17, move apart due to their spring action. The square hole 18, thus becomes enlarged and it is possible to push same over the head 28 of the square stud 27, in washer 25 of the steel wool pad 24. By releasing the thumb pressure upon cap nut 14, the spring 23, will push the tubular member 12 back and the jaws 16 and 17 will close over the square stud 27.

The handle grip with the pad attached, is now ready to use, but if the same is to be used vigorously and for any length of time, it might be desirable to secure the pad more rigidly by tightening up on the lock nut 13. When the lock nut 13 is screwed up tightly against the end of the handle 10, it draws the tubular member 12, through the handle grip and forces the jaws 16 and 17 together tightly by means of the conical bore 15a at the other end of the handle.

It will be noted from the above, that this device makes it possible to use steel wool and similar cleaning pads effectively and speedily without touching same with the hands. To the modern woman with manicured finger nails and delicate fingers, this is a great advantage. It is also an advantage to be able to use the cleaning pad at the end of a strong and practical handle thereby giving the operator the possibility of using the force of the inside hand rather than the finger tips, as is common when using such pads without the handle.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

A device of the class described comprising an elongated handle grip formed with several flats on its sides, whereby to prevent rolling, said handle grip having a longitudinally extending hole therethrough, a tubular member slidably inserted in said hole and extending outwardly of the ends thereof, said tubular member being split along the greater portion of its length, and an unsplit portion of said tubular member threaded at one end, the split portion of the tubular member being formed into jaws of a chuck, the latter being made with two dents adapted to form a square hole, whereby to receive the stud of a pad, a lock nut and a cap nut placed upon the threaded portion of said tubular member extending outside one end of said handle grip, a stop member in said tubular member fastened to said handle grip by means of a pin extending through said split portion of said tubular member, and a cylindrical helical spring held in compression between the stop member and said cap nut.

References Cited in the file of this patent

UNITED STATES PATENTS

| | | |
|---|---|---|
| 890,348 | Felix | June 9, 1908 |
| 977,305 | Heppe | Nov. 29, 1910 |
| 1,284,597 | Clinchy | Nov. 12, 1918 |
| 1,538,279 | Faucon | May 19, 1925 |
| 2,205,606 | Storer | June 25, 1940 |
| 2,320,611 | Kandle | June 1, 1943 |
| 2,438,152 | De Semple | Mar. 23, 1948 |
| 2,477,471 | Wolfe | July 26, 1949 |
| 2,493,835 | Schimel | Jan. 10, 1950 |
| 2,572,178 | Monroe et al. | Oct. 23, 1951 |

FOREIGN PATENTS

| | | |
|---|---|---|
| 346,327 | France | Nov. 22, 1904 |